US010277911B2

(12) United States Patent
Zenoni

(10) Patent No.: US 10,277,911 B2
(45) Date of Patent: Apr. 30, 2019

(54) VIDEO PROCESSING WORKLOAD MANAGEMENT

(71) Applicant: WOWZA MEDIA SYSTEMS, LLC, Golden, CO (US)

(72) Inventor: Ian Zenoni, Highlands Ranch, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/004,607

(22) Filed: Jan. 22, 2016

(65) Prior Publication Data

US 2017/0214927 A1    Jul. 27, 2017

(51) Int. Cl.
*G06F 15/16* (2006.01)
*G06F 9/50* (2006.01)
*H04N 19/42* (2014.01)
*G06F 17/30* (2006.01)
*H04N 19/40* (2014.01)
*H04N 19/127* (2014.01)
*H04N 19/156* (2014.01)
*H04N 19/436* (2014.01)
*H04N 19/169* (2014.01)

(52) U.S. Cl.
CPC .............. *H04N 19/42* (2014.11); *G06F 9/505* (2013.01); *G06F 9/5044* (2013.01); *G06F 17/3082* (2013.01); *H04N 19/127* (2014.11); *H04N 19/156* (2014.11); *H04N 19/188* (2014.11); *H04N 19/40* (2014.11); *H04N 19/436* (2014.11)

(58) Field of Classification Search
CPC ............. H04L 29/0651; H04L 29/0604; H04L 29/08783; H04L 29/08792; H03M 7/30; H04N 5/917
See application file for complete search history.

(56) References Cited

U.S. PATENT DOCUMENTS 5,963,911 A    10/1999 Walker et al.
7,092,985 B2 *  8/2006 Hubbard ............... G06F 9/5044
                                                            709/201
7,536,373 B2    5/2009 Kelkar et al.
(Continued)

OTHER PUBLICATIONS

Amazon EC2 Instance Types, https://aws.amazon.com/ec2/instance-types/, printed Dec. 21, 2015, 19 pages.
(Continued)

Primary Examiner — Md N Haque
(74) Attorney, Agent, or Firm — Toler Law Group, PC

(57) ABSTRACT

A particular method includes determining, at a processor of a computing device, a plurality of hardware scores associated with a plurality of hardware systems, where each of the plurality of hardware scores corresponds to a respective one of the plurality of hardware systems. The method also includes receiving data indicating a video processing workload and determining a workload score associated with the video processing workload based on the data. The method further includes identifying one or more of the plurality of hardware systems to execute the video processing workload. The one or more hardware systems are identified based on a comparison of the workload score to one or more hardware scores of the one or more hardware systems. The method includes assigning the one or more hardware systems to execute the video processing workload.

20 Claims, 6 Drawing Sheets

(56) References Cited

U.S. PATENT DOCUMENTS

| | | | |
|---|---|---|---|
| 7,559,078 B2 | 7/2009 | Zhang et al. | |
| 8,566,370 B2 | 10/2013 | Jin et al. | |
| 8,610,603 B2 | 12/2013 | Lai et al. | |
| 9,009,289 B1* | 4/2015 | Jacob | G06Q 30/0206 370/216 |
| 9,009,421 B2* | 4/2015 | Birkestrand | G06F 12/00 711/153 |
| 2006/0267989 A1* | 11/2006 | Campbell | G06T 1/20 345/502 |
| 2007/0002865 A1 | 1/2007 | Burks et al. | |
| 2007/0234365 A1* | 10/2007 | Savit | G06F 9/505 718/104 |
| 2011/0292057 A1* | 12/2011 | Schmit | G06F 9/5044 345/520 |
| 2012/0149464 A1* | 6/2012 | Bone | G06F 9/5044 463/30 |
| 2013/0054813 A1* | 2/2013 | Bercovici | G06F 9/4856 709/226 |
| 2013/0055250 A1* | 2/2013 | Pechanec | G06F 11/3428 718/1 |
| 2013/0148741 A1 | 6/2013 | Steinberg et al. | |
| 2015/0058400 A1* | 2/2015 | Parikh | H04L 67/1002 709/203 |
| 2016/0357610 A1* | 12/2016 | Bartfai-Walcott | G06F 9/5027 |

OTHER PUBLICATIONS

Google Cloud Platform, Machine Types—Compute Engine, https://cloud.google.com/compute/docs/machine-types, printed Dec. 21, 2015, 9 pages.

Jokhio et al., "Cost-Efficient Dynamically Scalable Video Transcoding in Cloud Computing," Turku Center for Computer Science, TUCS Technical Report, No. 1098, Dec. 2013, 29 pages.

Kupferman et al., "Scaling Into the Cloud," CS270, Advances Operating Systems, http://cs.ucsb.edu/~jkupferman/docs/ScalingIntoTheClouds.pdf, 2009, 8 pages.

Phillips et al., "Snow White Clouds and the Seven Dwarfs," 2011 IEEE Third International Conference on Cloud Computing Technology and Science (CloudCom), Athens, Greece, Nov. 29-Dec. 1, 2011, pp. 738-745.

* cited by examiner

VIDEO PROCESSING WORKLOAD MANAGEMENT

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

A video streaming system that supports delivery of streaming video to different types of devices often performs decoding and encoding operations. In the case of live video, the encoding and decoding operations are ideally performed in real-time or near-real-time. In such systems, the choice of hardware used to perform the encoding and decoding operations can impact performance and cost. For example, using large computers may enable real-time encoding/decoding, but may be excessive for certain workloads, leading to computing resources being idle. On the other hand, if sufficient hardware resources are not provided, a video stream may "skip" or "stutter," resulting in a frustrating viewing experience for an end user. It may thus be difficult to determine an "ideal" or "efficient" hardware configuration for a given video processing workload.

SUMMARY

Systems and methods of video processing workload management are disclosed. The present disclosure utilizes a point system to pair hardware configurations with video processing workloads. To illustrate, hardware configuration settings may be assigned point values. Examples of hardware settings can include, but are not limited to, CPU (processor (or central processing unit), where a faster processor is assigned more points), memory (where more memory capacity is assigned more points), number of processing cores, GPU (graphics processing unit), etc. A total point value for a particular computer system can reflect video processing capability of the computer system. The computer system can be a local system or a cloud-based system, such as a cloud-based virtual machine.

Video processing workloads may also be assigned point values. To illustrate, more complex video processing workloads typically require more hardware capability. As an example, higher point values may be assigned to video processing workloads that have large frame size, a large number of adaptive bitrate (ABR) renditions, and/or high bitrate(s). In some examples, the point values are assigned to computer systems and/or video processing workloads manually, such as by a user or an administrator. Alternatively, the point values can be automatically determined based on application of a rules engine. In yet another example, a neural network can be trained and used to assign point values to hardware and video processing workloads.

When a video processing workload is received, a first point value, also referred to herein as a "workload score," can be calculated for the video processing workload. The video processing workload can be modeled as a transcoder having particular input stream and output stream settings (e.g., frame size, bitrate, etc.). To determine a hardware configuration or system that is suitable to execute the video processing workload, the workload score may be compared with point values of available systems. The point value of a particular system is also referred to herein as a "hardware score." In one example, the system having a hardware score that matches (or is close to) the workload score is assigned to execute the video processing workload.

The techniques described herein may thus enable identification of a computer system that is "powerful enough" to execute a given video processing workload. In some examples, when a workload is complex and has a high workload score, a combination of multiple systems, rather than a single system, can be selected to collectively execute the workload. In this situation, the systems may collectively have a hardware score that matches or is close to the workload score. In some examples, a neural network is used to train and refine a model that maps different hardware characteristics and video processing workload characteristics to points.

DETAILED DESCRIPTION

Figure 1:
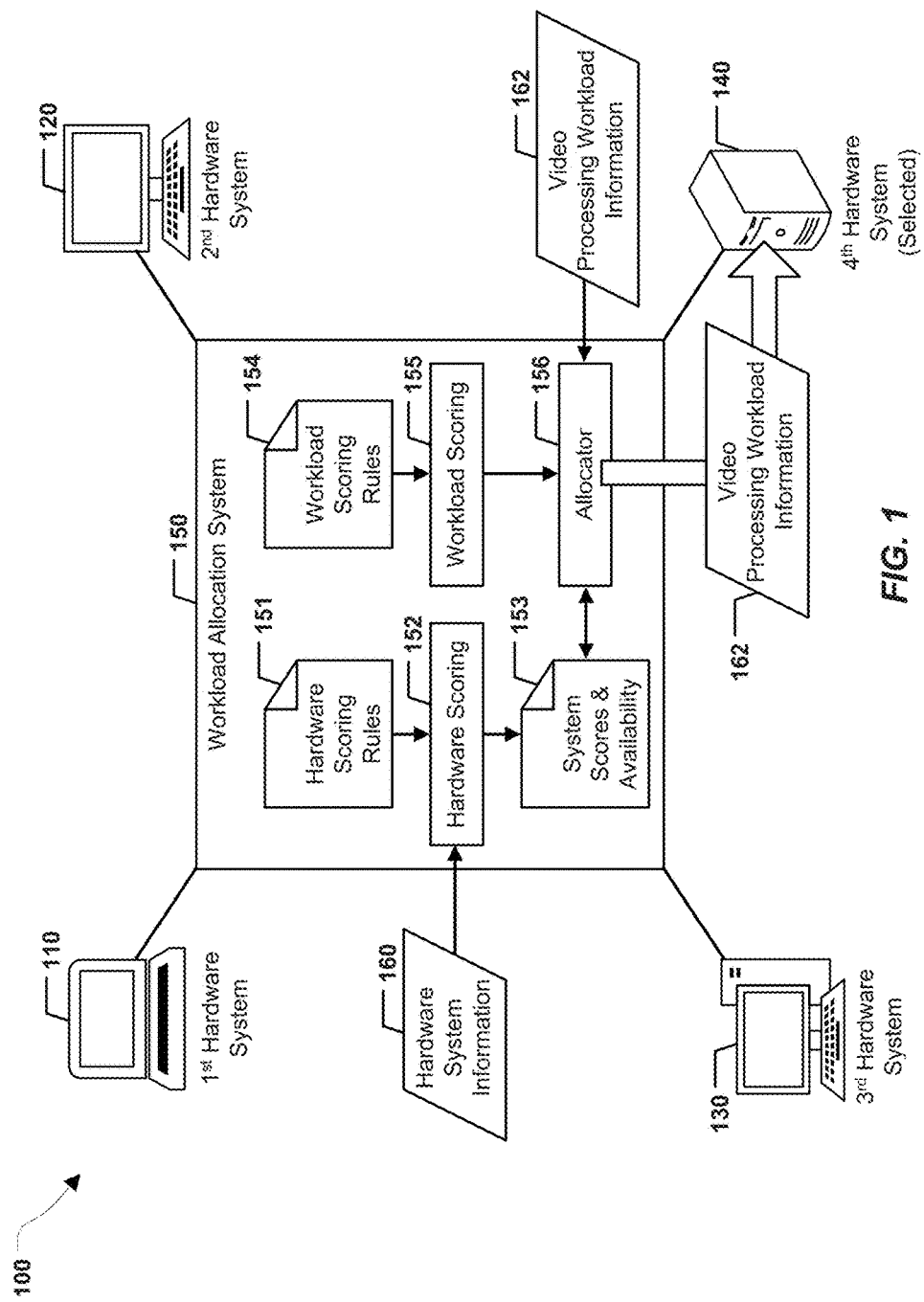
FIG. 1 is a block diagram of a particular embodiment of a system that is operable to perform video processing workload management.

FIG. 1 is a block diagram of a particular embodiment of a system 100 that is operable to perform video processing workload management. The system includes a workload allocation system 150 that is communicatively coupled to one or more hardware systems, such as illustrative hardware systems 110, 120, 130, 140.

The workload allocation system 150 may include one or more processors (e.g., central processing units (CPUs)), one or more memory devices (e.g., random access memory (RAM), read-only memory (ROM), etc.), disk-based storage, solid-state drive (SSD) storage, flash memory storage, etc., and one or more network interfaces that enable the workload allocation system to communicate via wired and/or wireless networks (e.g., local area networks (LANs), wide area networks (WAN), the Internet, etc.).

The workload allocation system 150 may also include a hardware scoring module 152, a workload scoring module 155, and an allocator module 156. Each of the modules 152, 155, 156 may correspond to hardware circuits of the workload allocation system 150 and/or software instructions stored in a memory of the workload allocation system 150 and executed by a processor of the workload allocation system 150.

The hardware scoring module 152 may be configured to receive hardware system information 160. For example, the hardware system information 160 may describe hardware characteristics of hardware systems connected to the workload allocation system, such as the hardware systems 110,

120, 130, 140. To illustrate, the hardware system information 160 may indicate a number of processors (e.g., CPUs), a processor manufacturer, a processor generation, an instruction set architecture (ISA), an amount of RAM, am amount and/or type of storage, a number of processor cores, a number of cores per processor, a number of graphics processing units (GPUs), a GPU type, etc. at each of the hardware systems 110, 120, 130, 140. The hardware scoring module 152 may determine a hardware score for each of the hardware systems 110, 120, 130, 140 based on the hardware system information 160.

For example, the hardware scoring module 152 may score the hardware systems 110, 120, 130, 140 using hardware scoring rules 151 that are stored at or accessible to the workload allocation system 150. To illustrate, the hardware scoring rules 151 may indicate that the hardware score of a hardware system should be increased by 5 points for each processor present in the hardware system. As another example, the hardware scoring rules 151 may indicate that the hardware score of a hardware system should be increased by 10 points for each gigabyte (GB) of RAM present in the hardware system.

Figure 2:
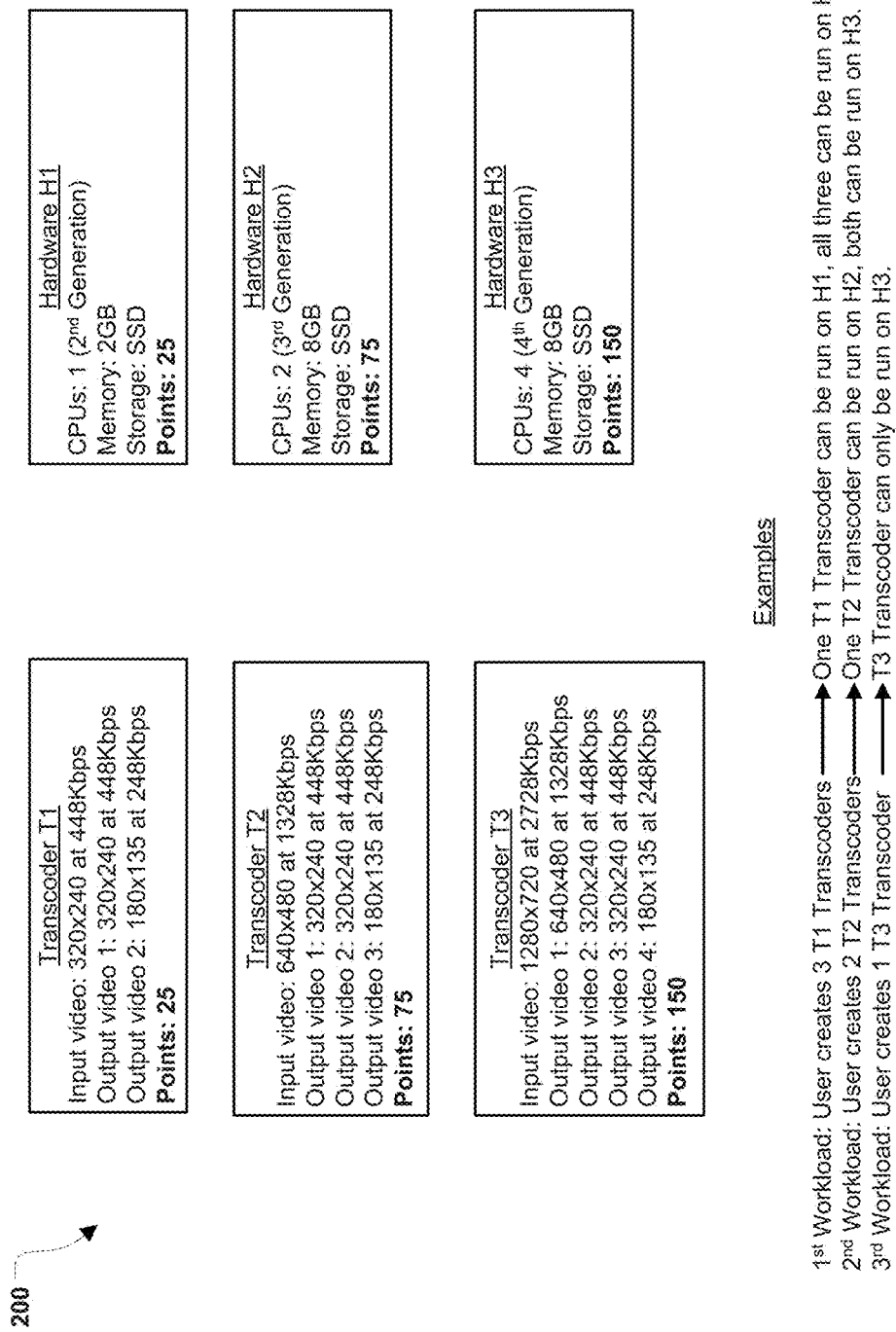
FIG. 2 is a diagram to illustrate examples of transcoders and hardware systems.

Examples of hardware scoring rules are further described with reference to FIG. 2. To illustrate, referring to FIG. 2, hardware scores for three illustrative hardware systems H1, H2, and H3 are shown and are generally designated 200. In the example of FIG. 2, the hardware system H1 has a hardware score of 25 points based on the hardware system H1 including one second-generation CPU, 2 GB of memory, and SSD storage. The hardware system H2 has a hardware score of 75 points based on the hardware system H2 including two third-generation CPUs, 8 GB of memory, and SSD storage. The hardware system H3 has a hardware score of 150 points based on the hardware system H3 including four fourth-generation CPUs, 8 GB of memory, and SSD storage.

Returning to FIG. 1, the hardware scoring system 152 may generate and update system scores and availability information 153. The system scores and availability information 153 may include hardware scores computed by the hardware scoring system 152. As hardware systems (or components thereof) are added and removed from the system 100, the hardware scoring module 152 may receive updated hardware system information 160 and may compute and store updated hardware scores in the information 153.

The workload scoring module 155 may operate as described with reference to the hardware scoring module 152, except that the workload scoring module 155 may score video processing workloads rather than hardware systems. To illustrate, the workload scoring module 155 may receive video processing workload information 162 describing a video processing workload and may calculate a workload score for the video processing workload using workload scoring rules 154 that are stored at or accessible to the workload allocation system 150.

As used herein, a video processing workload may describe video processing operations that are to be performed by one or more hardware systems that are (or will be) assigned/allocated to the video processing workload. In the context of media streaming, the parameters of a video processing workload may correspond to a transcoder configuration, because, like a transcoder, a video processing workload may have one or more input streams and one or more output streams. It is to be understood that as used herein, a transcoder may also perform transmuxing operations. The input and output stream(s) may have various bitrates, frame sizes, etc. To illustrate, FIG. 2 provides examples of workload scores for three video processing workloads, designated as transcoder T1, transcoder T2, and transcoder T3. The transcoder T1 has a workload score of 25 points based on a 448 kilobits per second (Kbps) input video stream having a frame size of 320×240 pixels and two output ABR renditions having bitrates of 448 Kbps and 248 Kbps, respectively, and frame sizes of 320×240 and 180×135, respectively. The transcoder T2 has a workload score of 75 points and the transcoder T3 has a workload score of 150 points, as shown. Thus, the workload score of a workload may be based on an input frame size, input bitrate, output frame size, output bitrate, number of ABR renditions, coders/decoders (CODECs) in use, etc. In some examples, the workload score of a workload may be at least partially based on a type of video content associated with the workload. For example, an animated video (e.g., cartoon) or a "talking head" video (e.g., a video with limited movement) may have a lower workload score than an action-packed and/or special effects-laden movie, because of the increased complexity involved in processing the action-packed and/or special effects-laden movie.

The allocator module 156 may be configured to receive a workload score for a particular video processing workload from the workload scoring module 155. The allocator module 156 may also be configured to access the information 153, which indicates hardware scores for various hardware systems. The allocator module 156 may select a particular hardware system to assign to the particular video processing workload based on comparing the hardware score of the particular hardware system and the video processing workload. In a particular embodiment, a hardware system may be selected for assignment to a workload based on the hardware score of the system being greater than or equal to the workload score of the workload.

To illustrate, as shown at the bottom of FIG. 2, if a user creates three instances of the transcoder T1, the total video processing workload score for this first video processing workload would be 25×3=75 points. One instance of the transcoder T1 can be run on the hardware system H1, and all three of the instances can be run on the hardware system H2 or the hardware system H3. Accordingly, in this example, the allocator module 156 may select the hardware system H2 or H3 to assign to the first video processing workload. FIG. 2 also illustrates a second workload (two T2 transcoders) and a third workload (one T3 transcoder), both of which may be excessively complex for the hardware systems H1 or H2 to execute, but may be executable by the hardware systems H3.

Returning to FIG. 1, after the allocator module 156 identifies and assigns a hardware system to the video processing workload associated with the video processing workload information 162, the allocator module 156 may forward the video processing workload information 162 to the selected hardware system. In the illustrated example, the fourth hardware system 140 is selected, so the video processing workload information 162 is forwarded to the fourth hardware system 140. The allocator module 156 may also update the system scores and availability information 153 to indicate that the fourth hardware system 140 is "busy," so that the fourth hardware system 140 is not assigned any additional workloads (or any additional workloads that exceed a threshold score). Thus, the information 153 may indicate availability of hardware systems (e.g., the hardware systems 110, 120, 130, 140) to take on additional video processing workloads For example, if a first workload assigned to the fourth hardware system 140 has a workload score of 50 points and the fourth hardware system 140 has a hardware score of 120 points, the information 153 may indicate that workloads having workload scores greater than 120−50=70 points should not be assigned to the fourth hardware system 140. When the fourth hardware system 140 completes servicing the first video processing workload, the fourth hardware system 140 may send a completion message to the workload allocation system 150, so that the information 153 indicates that the fourth hardware system 140 is "completely available" rather than "partially available."

The system 100 of FIG. 1 may thus enable dynamic assignment of video processing workloads to hardware based on a points system. Using the points system may help reduce or eliminate the likelihood a complex workload is assigned to a hardware system with insufficient resources to execute the workload. Using the points system may also help reduce or eliminate hardware resources being left idle, such as due to a powerful hardware system being assigned one or a few simple workloads.

Figure 3:
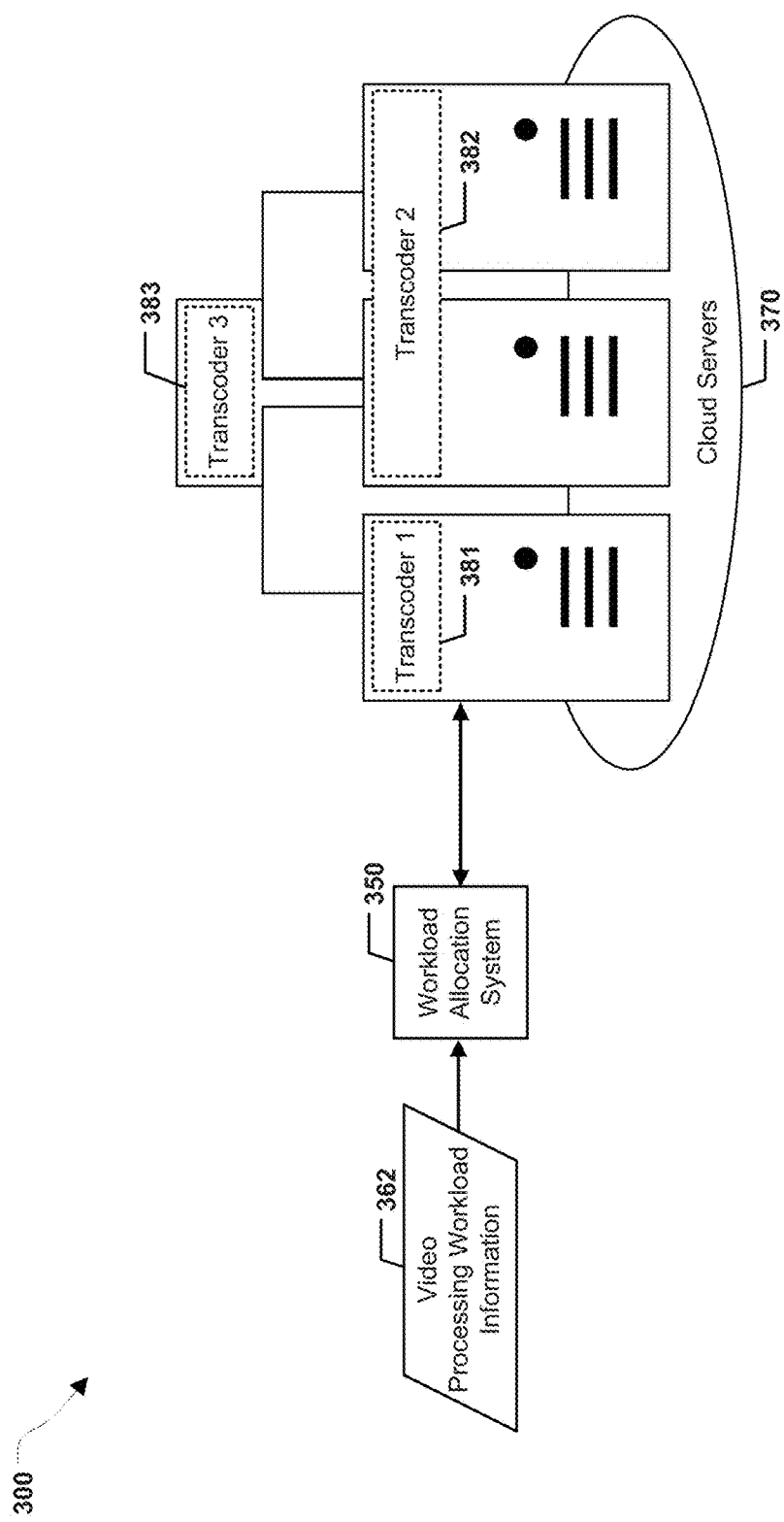
FIG. 3 is a is a block diagram of another particular embodiment of a system that is operable to perform video processing workload management.

Whereas FIG. 1 illustrates an example in which the workload allocation system 150 may be directly connected to the hardware systems 110, 120, 130, 140, it should be noted that this is not to be considered limiting. The systems and methods of the present disclosure may also be used in systems where devices are located remote from each other. For example, FIG. 3 illustrates an embodiment of a cloud-based system 300 in which a workload allocation system 350 is communicably coupled to cloud servers 370.

The workload allocation system 350 may include components corresponding to components described with reference to the workload allocation system 150 of FIG. 1. The workload allocation system 350 may determine hardware scores for each of the cloud servers. Alternatively, or in addition, the workload allocation system 350 may determine hardware scores for cloud-based virtual machines (VMs) executed at one or more of the cloud servers 370. To illustrate, the cloud servers 370 may be part of a cloud service offering from a cloud service provider. To use the cloud servers 370, a user may select a particular VM from a list of VMs offered by the cloud service provider. Each VM may have hardware characteristics, such as a number of processors, an amount of memory, etc. For example, a first VM may have one CPU, and one GB of RAM, a second VM may have sixteen CPUs, sixty-four GB of RAM, and four thousand megabits per second (Mbps) of dedicated throughput, a third VM may have eight CPUs, fifteen GB of RAM, thirty-two GB of SSD storage, etc. The workload allocation system 350 may compute hardware scores associated with each VM offered by the cloud service provider. Examples of cloud service providers include, but are not limited to, Amazon Web Services and Google Compute Engine.

When the workload allocation system 350 receives video processing workload information 362 associated with a video processing workload, the workload allocation system 350 may determine a workload score for the video processing workload, as described with reference to FIG. 1. The workload allocation system 350 may then select (or recommend to a user) a particular VM or set of VMs to assign to the video processing workload. Alternatively, or in addition, the workload allocation system 350 may request instantiation of the recommended VMs by cloud service provider(s) and may bill a user for use of the recommended VMs. The recommended VMs may be instantiated and executed at the cloud servers 370. In the example of FIG. 3, a first transcoder 381 and a third transcoder 383 are each executed on a single cloud server, but a more complex second transcoder 382 is executed by multiple cloud servers. It is therefore to be understood that the techniques of the present disclosure support assigning multiple hardware systems to a single video processing workload, for example when a sum of the hardware scores of the multiple hardware systems is greater than or equal to the workload score of the video processing workload.

Figure 4:
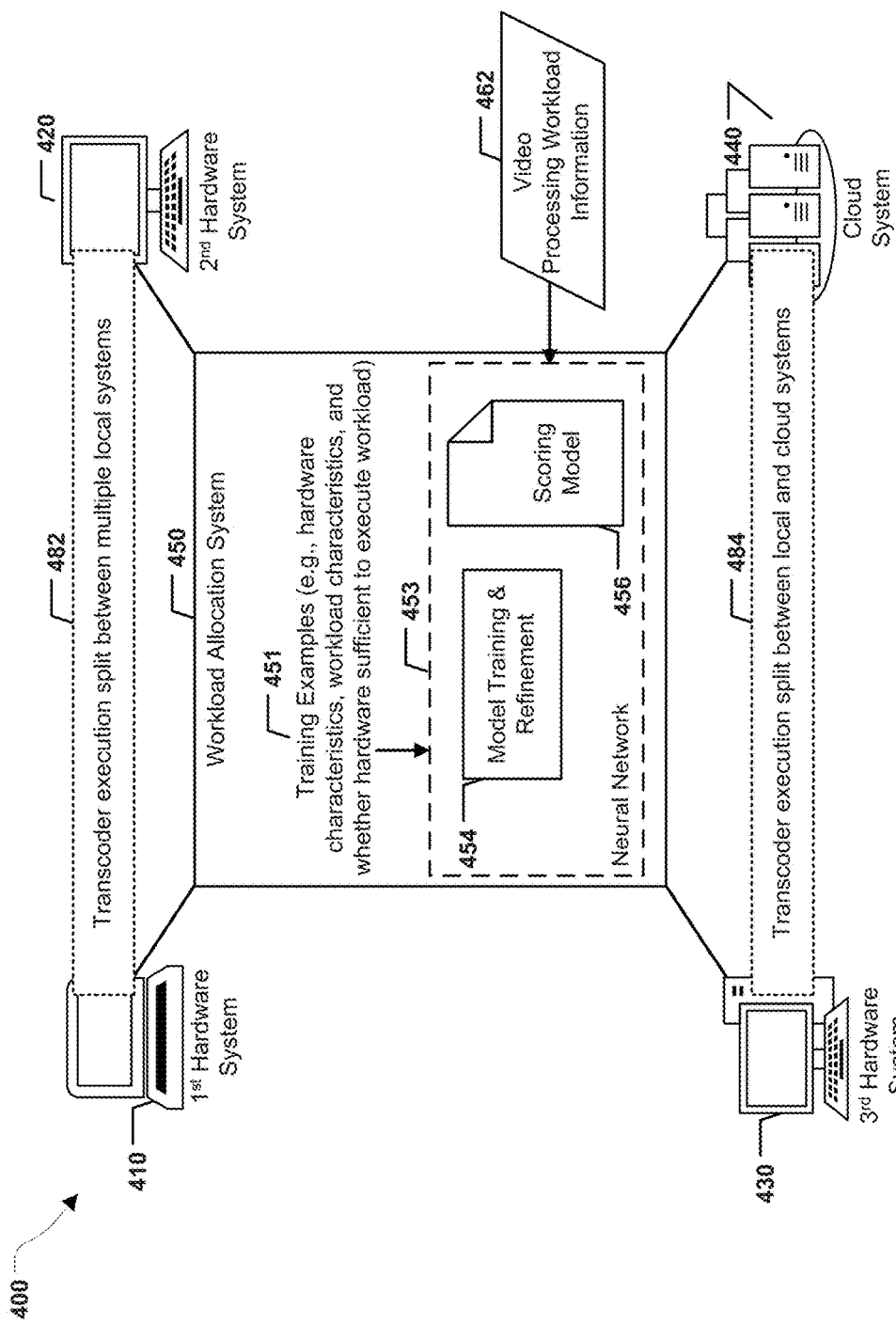
FIG. 4 is a block diagram of another particular embodiment of a system that is operable to perform video processing workload management.

FIG. 4 illustrates a combined (part cloud-part local) system that includes a workload allocation system 450, "local" hardware systems 410, 420, 430, and a cloud system 440. As shown in FIG. 4, transcoder execution can be split between multiple local systems, at 482, or between local and cloud systems, at 484.

In FIG. 4, the workload allocation system includes a neural network 453. The neural network 453 may enable assigning normalized point totals to hardware systems and video processing workloads, such that when a hardware system has a higher hardware score than the workload score of a workload, the hardware system is "known" to have sufficient resources to execute the workload assuming "normal" (e.g., error-free) operating conditions.

The neural network 453 may include model training and refinement module 454, which may correspond to hardware circuits of the workload allocation system 450 and/or software instructions stored in a memory of the workload allocation system 450 and executed by a processor of the workload allocation system 450. During a training period, the model training and refinement module 454 may receive training examples 451. In a particular embodiment, each training example may include hardware characteristics of one or more hardware systems, workload characteristics of a video processing workload, and whether the one or more hardware systems were sufficient to execute the video processing workload. The training examples 451 may be generated based on user input and/or may correspond to real-life observations collected in a computing environment regarding success or failure of hardware systems executing certain workloads.

For example, the training examples 451 may include examples generated from logs generated at the hardware systems 410, 420, 430 and/or the cloud system 440. To illustrate, when an entry in a log file indicates an error associated with a workload, the entry may be used to generate a training example 451 indicating that a particular hardware system configuration was unable to successfully execute a video processing workload. Conversely, when an entry in a log file indicates completion of a workload, the entry may be used to generate a training example 451 indicating that a particular hardware system configuration able to successfully execute a video processing workload. Additional training examples may be generated when log files are updated, when new log files are created, when additional hardware resources are added or removed from the system 400, etc.

Each time an additional training examples 451 is processed, the neural network 453 may receive additional data regarding combinations of hardware characteristics are likely sufficient to execute corresponding combinations of workload characteristics. For example, the training examples 451 may collectively indicate that certain hardware characteristics (e.g., number of processors) are more closely related to success or failure of workload execution than other hardware characteristics (e.g., disk-based storage vs. SSD storage). The model training and refinement module 454 may generate a scoring model 456 based on the training examples 451, such that use of the scoring model 456 results in determining similar point values to hardware systems and video processing workloads that would, according to the training examples 451, be successfully executed by the hardware systems.

For example when one or more training examples 451 indicate that a specific combination of hardware characteristics successfully executed a workload having a specific combination of workload characteristics, the scoring model 456 may be adjusted so that if the same combination of hardware characteristics and workload characteristics are input into the workload allocation system 450, the resulting hardware score and workload score are approximately equal. Conversely, when one or more training examples 451 indicate that a specific combination of hardware characteristics did not successfully execute a workload having a specific combination of workload characteristics, the scoring model 456 may be adjusted so that if the same combination of hardware characteristics and workload characteristics are input into the workload allocation system 450, the resulting hardware score and workload score are not equal.

The scoring model 456 may be refined as additional training examples 451 are processed via backpropagation. The scoring model 456 may also be refined via backpropagation during operation at the system 400. For example, the neural network 453 may receive video processing workload information 462, determine workload score for the video processing workload, and assign one or more hardware systems (which may be local and/or cloud systems) to the video processing workload based on the calculated workload score being less than or equal to the collective hardware score of the one or more hardware systems. In an illustrative example, data of the neural network 453 (e.g., data modeling "neurological" connections between nodes of the neural network 453) is stored in a memory of the workload allocation system 450, and the training examples 451, the video processing workload information 462, etc. are input into the circuitry or a software application configured to access the data of the neural network 453 and generate one or more outputs (e.g., hardware scores, workload scores, assignment of specified hardware system(s) to a particular workload, etc.).

When execution of video processing workload is successfully completed or fails, the neural network 453 may refine the scoring model 456 based on the success or failure via backpropagation. For example, success may strengthen relationships in the scoring model 456 of certain point values to certain hardware/workload characteristics, whereas failure may weaken such relationships. In some cases, a stronger level of success or failure, and/or a greater number of successes/failures may result in a greater change to the scoring model 456 than a weaker level of success or failure and/or a lesser number of successes/failure.

In some examples, a workload allocation system (e.g., the workload allocation system 150 of FIG. 1, the workload allocation system 350 of FIG. 3, and/or the workload allocation system 450 of FIG. 4) may recommend changes to a transcoder (or a video processing workload) to increase a likelihood of successful transcoder operation (or completion of the video processing workload). For example, when a workload has a workload score that exceeds the hardware score of any available transcoding system or combination of transcoding systems, the workload allocation system may prompt a user to "simplify" the workload. To illustrate, the workload allocation system may prompt the user to decrease a number of input or output streams, decrease a bitrate of one or more of the input or output streams, etc. Conversely, if additional transcoding capacity is available, the workload allocation system may ask whether the user wants to increase the complexity of the workload, such as by increasing the number and/or bitrate of input and/or output streams.

In some examples, a workload allocation system (e.g., the workload allocation system 150 of FIG. 1, the workload allocation system 350 of FIG. 3, and/or the workload allocation system 450 of FIG. 4) may perform load balancing across available hardware systems. For example, the workload allocation system may assign video processing workloads to hardware systems such that a difference between resource utilization at the busiest and least busy system is less than a first threshold, such that each system has resource utilization satisfying a second threshold, etc.

The system 400 of FIG. 4 thus illustrates an example of automatically determining point values for hardware systems (including cloud-based VMs) and video processing workloads based on a neural network. Using a neural network may be more convenient than manually defining scoring rules. In addition, the neural network may continuously "learn" during operation, which may enable more accurate scoring and assignment of hardware systems to workloads.

Figure 5:
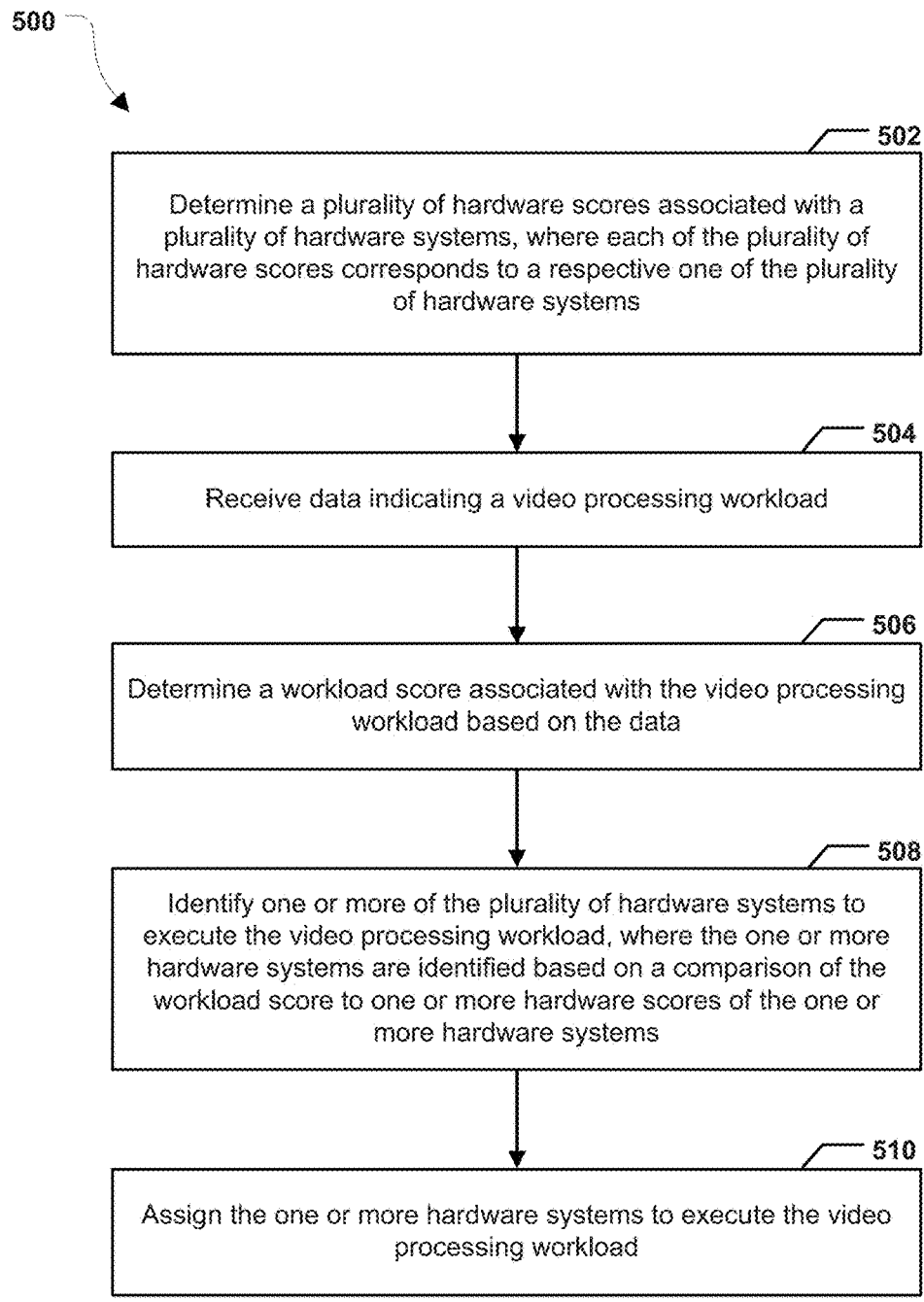
FIG. 5 is a flowchart to illustrate a particular embodiment of a method of performing video processing workload management.

Referring to FIG. 5, a particular embodiment of a method 500 of performing video processing workload management is shown. In an illustrative example, the method 500 may be performed by the workload allocation system 150 of FIG. 1, the workload allocation system 350 of FIG. 3, the workload allocation system 450 of FIG. 4, or any combination thereof.

The method 500 may include determining a plurality of hardware scores associated with a plurality of hardware systems, at 502. Each of the plurality of hardware scores may correspond to a respective one of the plurality of hardware systems. For example, the hardware scoring module 152 of the workload allocation system 150 may determine hardware scores for the hardware system 110, 120, 130, 140 based on the hardware system information 160, as described with reference to FIG. 1. As another example, the neural network 453 may be used determine hardware scores based on the scoring model 456, as described with reference to FIG. 4.

The method 500 may also include receiving data indicating a video processing workload, at 504, and determining a workload score associated with the video processing workload based on the data, at 506. For example, the workload allocation system 150 may receive the video processing workload information 162 and the workload scoring module 155 may determine a workload score based on the information 162. As another example, the workload allocation system 450 may receive the video processing workload information 462 of FIG. 4 and the neural network 453 may be used to determine a workload score based on application of the scoring model 456 to the information 462.

The method 500 may further include identifying one or more of the plurality of hardware systems to execute the video processing workload, at 508, and assigning the one or more hardware systems to execute the video processing workload, at 510. The one or more hardware systems may be identified based on a comparison of the workload score to one or more hardware scores of the one or more hardware systems. For example, the allocator module 156 may assign the fourth hardware system to execute the video processing workload, as described with reference to FIG. 1. As another example, the neural network 453 may be used to assign one or more of the "local" hardware system 410, 420, 430 and/or component(s) of the cloud system 440 to execute the video processing workload, as described with reference to FIG. 4.

The method 500 of FIG. 5 may thus enable dynamic assignment of video processing workloads to hardware based on hardware/workload scores. The method 500 of FIG. 5 may help reduce or eliminate the likelihood a complex workload is assigned to a hardware system with insufficient resources to execute the workload. The method 500 of FIG. 5 may also help reduce or eliminate hardware resources being left idle due to a powerful hardware system being assigned one or a few simple workloads.

Figure 6:
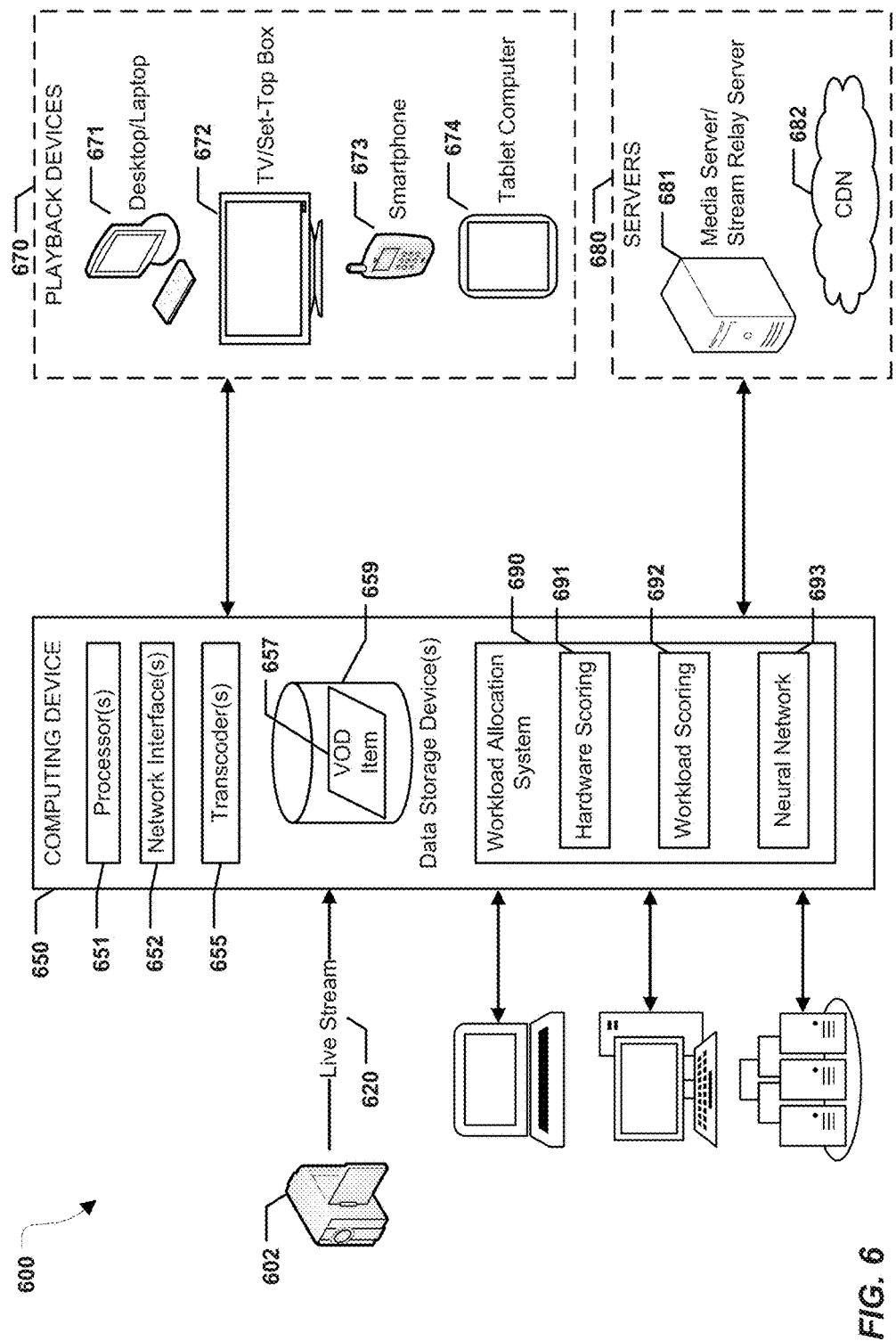
FIG. 6 is a block diagram of another particular embodiment of a system that is operable to perform video processing workload management.

FIG. 6 is a diagram to illustrate another particular embodiment of a system 600 that is operable to perform video processing workload management. The system 600 includes a computing device 650 that is configured to send data to and receive data from various other devices (e.g., via a network, such as a local area network (LAN) or the Internet). For example, the computing device 650 may communicate with one or more playback devices 670 (e.g., devices that are configured to stream video content) and one or more other servers 680. In an illustrative embodiment, the computing device 650 may correspond to the workload allocation system 150 of FIG. 1, one or more of the hardware systems 110, 120, 130, 140 of FIG. 4, the workload allocation system 350 of FIG. 3, one or more of the cloud servers 370 of FIG. 3, the workload allocation system 450 of FIG. 4, the hardware systems 410, 420, 430 of FIG. 4, one or more components (e.g., servers) of the cloud system 440 of FIG. 4, or any combination thereof. It should be noted that the illustrated playback devices 670 are examples. The playback devices 670 may include additional client devices and/or other types of devices capable of accessing webpages and/or playing media streams.

The computing device 650 may include one or more processors 651 and various components that are executable by the processor(s) 651. The computing device 650 may correspond to or include software application(s) that perform media serving or processing, hardware systems (e.g., servers) that support or perform media serving and processing, or any combination thereof. Thus, various operations described with reference to the computing device 650, or components thereof, may be implemented using hardware, software (e.g., instructions executable by the processor(s) 651), or any combination thereof.

The computing device 650 may include one or more network interfaces 652. For example, the network interface(s) 652 may include input interface(s) and output interface(s) that are configured to receive data and to send data, respectively. In a particular embodiment, the network interface(s) 652 may be wired and/or wireless interfaces that enable the computing device 650 to communicate data via a network, such as the Internet. For example, the network interface(s) 652 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 652 may be configured to receive one or more media streams, such as an illustrative live media stream 620 from a capture source 602 (e.g., a camera) or a computing device that includes or is coupled to the capture source 602. The live media stream 620 may include audio data, video data, text data, closed captioning (CC) data, and/or subtitle data. The network interface(s) 652 may also be configured to transmit data to the one or more playback devices 670 (e.g., a smartphone, a tablet computer, a laptop computer, a desktop computer, a set-top box, a television, a portable media player, a game console, etc.). In the embodiment of FIG. 6, the playback devices 670 include a desktop/laptop computing device 671, a television (TV)/set-top box 672, a smartphone 673, and a tablet computer 674.

The network interface(s) 652 may further be configured to transmit data to the one or more other servers 680 (e.g., a media server, a stream relay server, a server of a content distribution network (e.g., an edge server), etc.). In the embodiment of FIG. 6, the other servers 680 include a media server/stream relay server 681 and a server of a content distribution network (CDN) 682. In a particular embodiment, data transmitted to the playback devices 670 and to the servers 680 includes video streams. The video streams may be associated with the same encoding format and transmission protocol or may be associated with different encoding formats and transmission protocols. In a particular embodiment, generating the video streams includes performing video decoding, encoding, transcoding, and/or transmuxing operations at the computing device 650 (e.g., to modify a video encoding format, an audio encoding format, a bitrate, an aspect ratio, packaging, etc. relative to the incoming media stream 620). In a transmuxing operation, encoded audio and video may be repackaged without modifying the encoded audio and video.

In a particular embodiment, the computing device 650 includes various components configured to perform stream processing functions. For example, the computing device 650 may include one or more video processing components, such as encoder(s), decoder(s), and/or transcoder(s) 655, each of which may be implemented using hardware, software, or both. In some examples, the transcoder(s) 655 may be executed by cloud-based virtual machines, such as virtual machines executed by one or more of the cloud servers 370 of FIG. 3 or at the cloud system 440 of FIG. 4. The transcoder(s) 655 may be configured to perform encoding, decoding, bitrate conversion, CODEC conversion, frame size conversion, etc. Depending on a format of a received stream, a playback format supported by a requesting device, and/or transcoding parameters in use, a transcoding operation performed by the transcoder(s) 655 may trigger a decoding operation and/or a re-encoding operation. In a particular embodiment, parameters used by the transcoder(s) 655 are stored in one or more transcoding templates at the computing device 650, such as an eXtensible Markup Language (XML) file or other file. The transcoder(s) 655 may thus enable the computing device 650 to process data in accordance with multiple coding technologies and protocols. In some examples, a transcoding template may correspond to, or may be used to generate, at least a portion of the video processing workload information 162 of FIG. 1, the video processing workload information 362 of FIG. 3, and/or the video processing workload information 462 of FIG. 4.

The computing device 650 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The computing device 650 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The computing device 650 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The computing device 650 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The computing device 650 may include one or more data storage devices 659 (e.g., random access memory (RAM), disk-based storage, etc.). The data storage device(s) 659 may store stream data (e.g., frames of a live video stream), files, closed caption data, images (e.g., to be overlaid on top of a video stream), and other data. In a particular embodiment, the data storage device(s) 659 store a video on demand (VOD) item 657. The VOD item 657 may include audio data, video data, text data, closed captioning (CC) data, and/or subtitle data. For example, the VOD item 657 may be a movie or a television show. Alternately, the VOD item 657 may be stored remote from the computing device 650 and may be accessible by the computing device 650 via a network (e.g., the Internet).

The computing device 650 may also include a workload allocation system 690, which may include one or more of a hardware scoring module 691, a workload scoring module 692, or a neural network 693. In an illustrative example, the hardware scoring module 691 operates as described with reference to the hardware scoring module 152 of FIG. 1. In an illustrative example, the workload scoring module 692 operates as described with reference to the workload scoring module 155 of FIG. 1. In an illustrative example, the neural network 693 operates and is used as described with reference to the neural network 453 of FIG. 1.

In a particular embodiment, the computing device 650 may support adaptive streaming. For example, the computing device 650 may be configured to generate an adaptive streaming manifest. The manifest may include information, such as a master rendition list, describing adaptive bitrate renditions that are available for adaptive streaming. To initiate an adaptive streaming session, a destination device (e.g., one of the playback devices 670) may request the manifest. Upon receiving the manifest, the destination device may determine which of the available renditions should be requested from the computing device 650. For example, the destination device may make such a determination based on buffering/processing capability at the destination device and/or network conditions (e.g., bandwidth) being experienced by the destination device.

Upon determining which rendition should be requested, the destination device may transmit a request to the computing device 650. Alternatively, the destination device may request and receive a rendition chunk list from the computing device 650, where the chunklist enables the destination device to request individual media chunks of an individual rendition. Thus, a request from the destination device may specify a particular portion or media chunk (e.g., portion "X") of the requested rendition. The particular portion may be specified using start/end frame numbers, start/end times, a portion number/identifier, etc. Depending on the adaptive streaming protocol in use, a requested portion may correspond to a "media chunk" of a rendition and/or a group of pictures (GOP). A "media chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The computing device 650 may generate key frame aligned portions for the adaptive streaming renditions, so that switching to a lower bitrate or higher bitrate rendition appears "seamless" (e.g., does not result in noticeable visual glitches or dropped frames).

It should be noted that the orders of steps described with reference to FIGS. 1-6 are to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the workload allocation system 150 of FIG. 1, one or more of the hardware systems 110, 120, 130, 140 of FIG. 4, the workload allocation system 350 of FIG. 3, one or more of the cloud servers 370 of FIG. 3, the workload allocation system 450 of FIG. 4, the hardware systems 410, 420, 430 of FIG. 4, one or more components (e.g., servers) of the cloud system 440 of FIG. 4, the computing device 650 of FIG. 6, the desktop/laptop computing device 671 of FIG. 6, the TV/set-top box 672 of FIG. 6, the smartphone 673 of FIG. 6, the tablet computer 674 of FIG. 6, the media server/stream relay server 681 of FIG. 6, a server (e.g., edge server) of the CDN 682 of FIG. 6, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes determining, at a processor of a computing device, a plurality of hardware scores associated with a plurality of hardware systems, where each of the plurality of hardware scores corresponds to a respective one of the plurality of hardware systems. The method also includes receiving data indicating a video processing workload and determining a workload score associated with the video processing workload based on the data. The method further includes identifying one or more of the plurality of hardware systems to execute the video processing workload. The one or more hardware systems are identified based on a comparison of the workload score to the one or more hardware scores of the one or more hardware systems. The method includes assigning the one or more hardware systems to execute the video processing workload.

In another particular embodiment, an apparatus includes a processor and a memory storing instructions executable by the processor to perform operations including determining a plurality of hardware scores associated with a plurality of hardware systems. Each of the plurality of hardware scores corresponds to a respective one of the plurality of hardware systems. The operations also include receiving data indicating a video processing workload and determining a workload score associated with the video processing workload based on the data. The operations further include identifying one or more of the plurality of hardware systems to execute the video processing workload. The one or more hardware systems are identified based on a comparison of the workload score to the one or more hardware scores of the one or more hardware systems. The operations include assigning the one or more hardware systems to execute the video processing workload.

In another particular embodiment, a computer-readable storage device stores instructions that, when executed, cause a computer to perform operations including determining a plurality of hardware scores associated with a plurality of hardware systems. Each of the plurality of hardware scores corresponds to a respective one of the plurality of hardware systems. The operations also include receiving data indicating a video processing workload and determining a workload score associated with the video processing workload based on the data. The operations further include identifying one or more of the plurality of hardware systems to execute the video processing workload. The one or more hardware systems are identified based on a comparison of the workload score to the one or more hardware scores of the one or more hardware systems. The operations include assigning the one or more hardware systems to execute the video processing workload.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a processor of a computing device, data indicating a video processing workload;
determining at least one video characteristic associated with the video processing workload based on the data, the at least one video characteristic comprising a frame size, a bitrate, a number of adaptive bitrate renditions, a transcoder configuration, a coder/decoder (CODEC) configuration, or a type of video content, wherein the at least one video characteristic is associated with a workload point value;
determining a workload score associated with the video processing workload based, at least in part, on the workload point value associated with the at least one video characteristic;
identifying one or more hardware systems of a plurality of hardware systems to execute the video processing workload, wherein the one or more hardware systems are identified based on a comparison of the workload score to one or more hardware scores of the one or more hardware systems, the one or more hardware scores comprising respective hardware point values, and wherein the one or more hardware scores are based on computing resources at the one or more hardware systems and workload scores of video processing workloads previously assigned to the one or more hardware systems;
assigning the one or more hardware systems to execute the video processing workload, wherein assigning the one or more hardware systems to execute the video processing workload comprises forwarding the data to at least one of the one or more hardware systems; and
dynamically updating the one or more hardware scores to indicate a reduced amount of available computing resources of the one or more hardware systems that are available to be assigned to another video processing workload, the reduced amount of available computing resources indicated by adjusting the one or more hardware scores to reflect that the video processing workload has been assigned to the one or more hardware systems.

2. The method of claim 1, wherein the comparison of the workload score to the one or more hardware scores indicates whether the one or more hardware systems are capable of processing the video processing workload.

3. The method of claim 1, wherein a particular hardware score for a particular hardware system is based at least in part on a number of central processing units (CPUs), a CPU manufacturer, a CPU generation, an instruction set architecture, or any combination thereof, associated with the particular hardware system.

4. The method of claim 1, wherein a particular hardware score for a particular hardware system is based at least in part on an amount of random access memory (RAM) in the particular hardware system.

5. The method of claim 1, wherein a particular hardware score for a particular hardware system is based at least in part on an amount of storage, a type of storage, or both, in the particular hardware system.

6. The method of claim 1, wherein a hardware score for a hardware system is based at least in part on a number of processor cores, a number of processing cores per processor, or both, in the hardware system.

7. The method of claim 1, wherein a hardware score for a hardware system is based at least in part on a number of graphics processing units (GPUs), a type of GPU, or both, in the hardware system.

8. The method of claim 1, wherein the frame size comprises an input frame size associated with the video processing workload, and wherein the bitrate comprises an input bitrate associated with the video processing workload.

9. The method of claim 1, wherein the frame size comprises an output frame size associated with the video processing workload, and wherein the bitrate comprises an output bitrate associated with the video processing workload.

10. The method of claim 1, wherein the one or more hardware scores are updated responsive to the video processing workload being assigned to the one or more hardware systems.

11. The method of claim 1, wherein the one or more hardware scores, the workload score, or both are determined based on operation of a neural network.

12. The method of claim 1, wherein the one or more hardware systems assigned to execute the video processing workload correspond to at least one cloud-based virtual machine.

13. The method of claim 1, wherein the one or more hardware systems are identified based on the workload score being less than or equal to a sum of the one or more hardware scores.

14. An apparatus comprising:
a processor; and
a memory storing instructions executable by the processor to perform operations comprising:
receiving data indicating a video processing workload;
determining at least one video characteristic associated with the video processing workload based on the data, the at least one video characteristic comprising a frame size, a bitrate, a number of adaptive bitrate renditions, a transcoder configuration, a coder/decoder (CODECs) configuration, or a type of video content, wherein the at least one video characteristic is associated with a workload point value;
determining a workload score associated with the video processing workload based, at least in part, on the workload point value associated with the at least one video characteristic;
identifying one or more hardware systems of a plurality of hardware systems to execute the video processing workload, wherein the one or more hardware systems are identified based on a comparison of the workload score to one or more hardware scores of the one or more hardware systems, and wherein the one or more hardware scores are based on computing resources at the one or more hardware systems and workload scores of video processing workloads previously assigned to the one or more hardware systems;
assigning the one or more hardware systems to execute the video processing workload, wherein assigning the one or more hardware systems to execute the video processing workload comprises forwarding the data to at least one of the one or more hardware systems; and
dynamically updating the one or more hardware scores to indicate a reduced amount of available computing resources of the one or more hardware systems that are available to be assigned to another video processing workload, the reduced amount of available computing resources indicated by adjusting the one or more hardware scores to reflect that the video processing workload has been assigned to the one or more hardware systems.

15. The apparatus of claim 14, wherein the one or more hardware systems are identified based on the workload score being less than or equal to a sum of the one or more hardware scores.

16. A computer-readable storage device storing instructions that, when executed, cause a computer to perform operations comprising:
receiving data indicating a video processing workload;
determining at least one video characteristic associated with the video processing workload based on the data, the at least one video characteristic comprising a frame size, a bitrate, a number of adaptive bitrate renditions, a transcoder configuration, a coder/decoder (CODECs) configuration, or a type of video content, wherein the at least one video characteristic is associated with a workload point value;
determining a workload score associated with the video processing workload based, at least in part, on the workload point value associated with the at least one video characteristic;
identifying one or more hardware systems of a plurality of hardware systems to execute the video processing workload, wherein the one or more hardware systems are identified based on the workload score being less than or equal to a sum of one or more hardware scores of the one or more hardware systems, and wherein the one or more hardware scores are based on computing resources at the one or more hardware systems and workload scores of video processing workloads previously assigned to the one or more hardware systems;
assigning the one or more hardware systems to execute the video processing workload, wherein assigning the one or more hardware systems to execute the video processing workload comprises forwarding the data to at least one of the one or more hardware systems; and
dynamically updating the one or more hardware scores to indicate a reduced amount of available computing resources of the one or more hardware systems that are available to be assigned to another video processing workload, the reduced amount of available computing resources indicated by adjusting the one or more hardware scores to reflect that the video processing workload has been assigned to the one or more hardware systems.

17. The apparatus of claim 14, wherein the comparison of the workload score to the one or more hardware scores indicates whether the one or more hardware systems are capable of processing the video processing workload.

18. The apparatus of claim 14, wherein a particular hardware score for a particular hardware system is based, at least in part, on a number of central processing units (CPUs), an amount of storage, a type of storage, a number of processor cores, a number of processing cores per processor, or a number of graphics processing units (GPUs).

19. The computer-readable storage device of claim 16, wherein the instructions further cause the computer to perform a comparison of the workload score to the one or more hardware scores, and wherein the comparison of the workload score to the one or more hardware scores indicates whether the one or more hardware systems are capable of processing the video processing workload.

20. The computer-readable storage device of claim 16, wherein a particular hardware score for a particular hardware system is based, at least in part, on a number of central processing units (CPUs), an amount of storage, a type of storage, a number of processor cores, a number of processing cores per processor, or a number of graphics processing units (GPUs).

* * * * *